(12) United States Patent
Gregory

(10) Patent No.: US 6,523,587 B2
(45) Date of Patent: Feb. 25, 2003

(54) DEVICE TO PREVENT FULL COLLAPSE OF A PNEUMATIC TIRE ON VEHICLES AND LARGE AIRCRAFT

(76) Inventor: William J. Gregory, 16841 Vanowen St., Apt. #1, Van Nuys, CA (US) 91406-4583

( * ) Notice: Subject to any disclaimer, the term of this patent is extended or adjusted under 35 U.S.C. 154(b) by 48 days.

(21) Appl. No.: 09/820,213

(22) Filed: Mar. 29, 2001

(65) Prior Publication Data

US 2001/0047842 A1 Dec. 6, 2001

Related U.S. Application Data

(60) Provisional application No. 60/197,401, filed on Apr. 14, 2000.

(51) Int. Cl.$^7$ ............................ B60C 17/04; B60C 17/06
(52) U.S. Cl. ........................................ 152/158; 152/520
(58) Field of Search ................................. 152/158, 520

(56) References Cited

U.S. PATENT DOCUMENTS

| 4,901,779 | A | | 2/1990 | Holzer |
| 5,012,849 | A | | 5/1991 | Ko |
| 5,141,039 | A | | 8/1992 | Tansei et al. |
| 5,186,771 | A | | 2/1993 | Carpentier et al. |
| 5,194,104 | A | | 3/1993 | Wada et al. |
| 5,593,520 | A | | 1/1997 | Boni et al. |
| 5,626,696 | A | | 5/1997 | Boni et al. |
| 5,660,653 | A | | 8/1997 | Gardetto |
| 5,772,805 | A | | 6/1998 | Bobst |
| 5,988,244 | A | * | 11/1999 | Chang .......................... 152/158 |

* cited by examiner

Primary Examiner—Adrienne C. Johnstone
(74) Attorney, Agent, or Firm—Richard C. Litman

(57) ABSTRACT

A device to prevent the full collapse of a pneumatic tire on vehicles and large aircraft includes three arcuate portions for cooperatively fitting over a tire rim to provide an underlying support surface for a tire carcass subsequent to losing air or gas pressure. The three arcuate band portions releasably couple together for mounting on the drop well of a tire rim to form a substantially continuous surface. The invention also has protective coverings removably disposed on the outer radial extent of the band portions. The protective coverings are provided with frictional means for engaging the inner wall of the tire to prevent circumferential or lateral displacement of the tire carcass during rotation of the wheel. An insert may be placed between the band and the drop well to position the band.

16 Claims, 10 Drawing Sheets

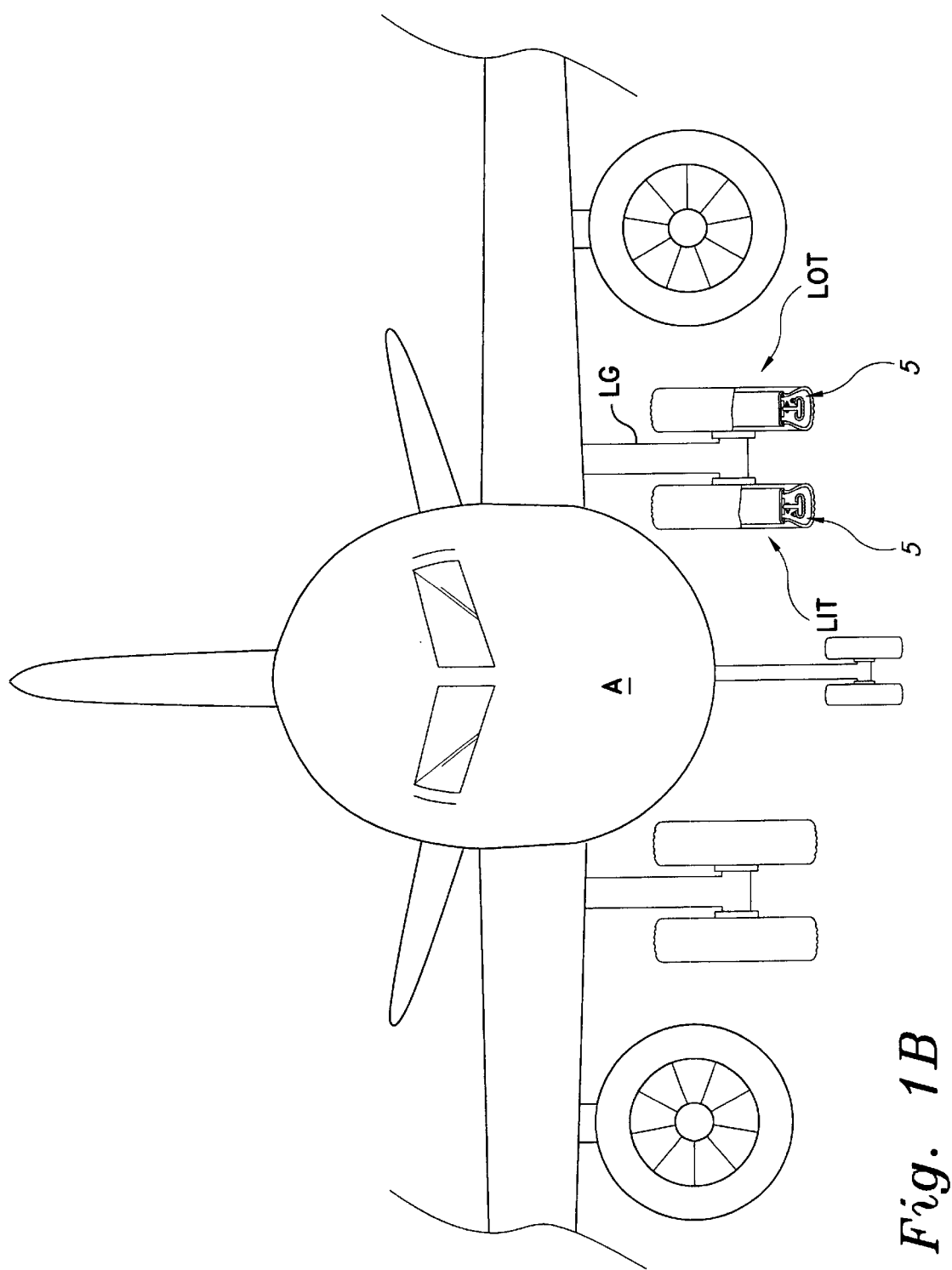

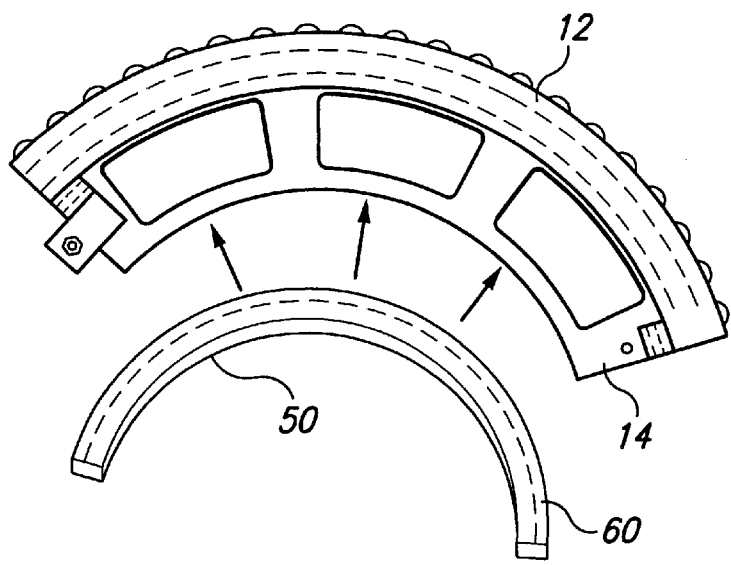
Fig. 4A
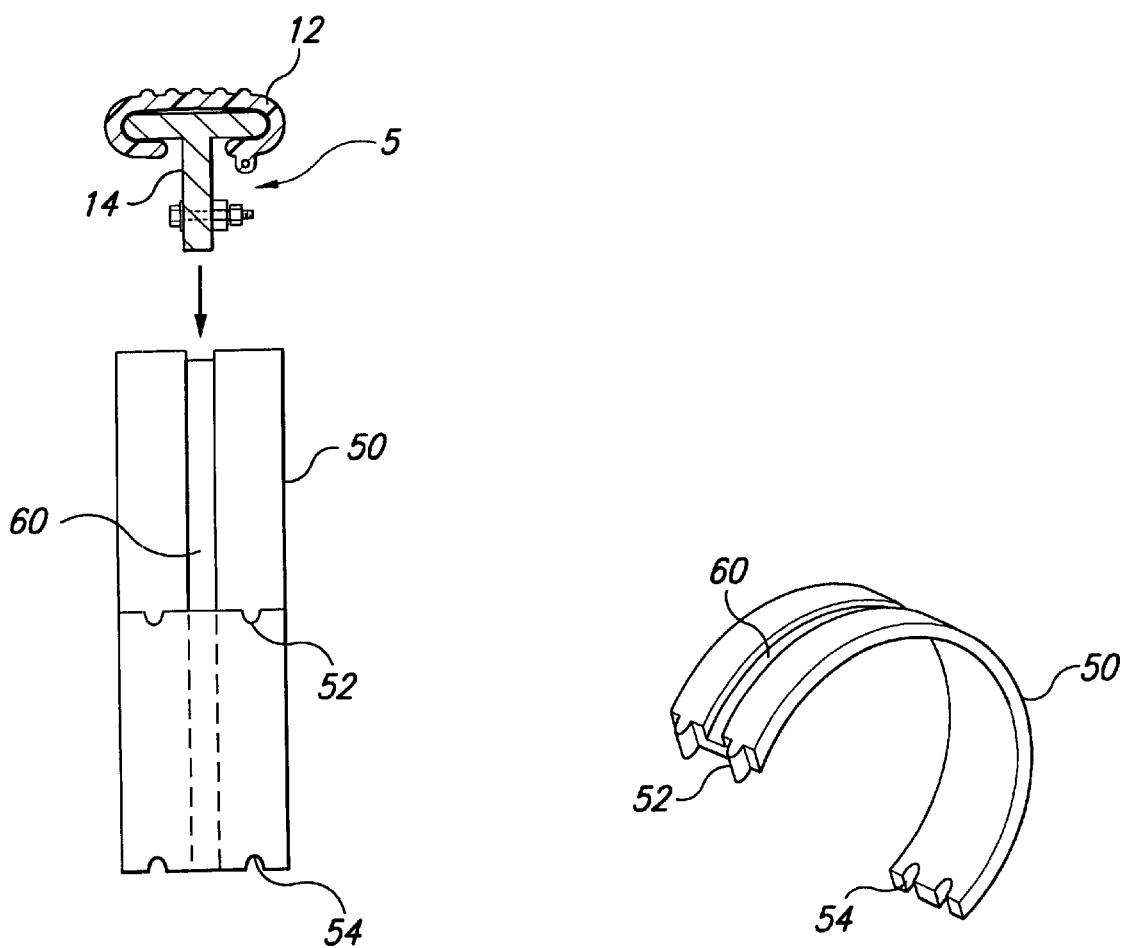
Fig. 4C
Fig. 4B

DEVICE TO PREVENT FULL COLLAPSE OF A PNEUMATIC TIRE ON VEHICLES AND LARGE AIRCRAFT

CROSS-REFERENCE TO RELATED APPLICATION

This application claims the benefit of U.S. Provisional Patent Application Serial No. 60/197,401, filed Apr. 14, 2000.

BACKGROUND OF THE INVENTION

1. Field of the Invention

The present invention relates generally to tires and more specifically to a core assembly for a pneumatic tire to permit safely running after loss of tire pressure.

2. Description of Related Art

Numerous inventions have been devised for providing increased safety for drivers who experience flat tires. Some of the most significant advances in the art have centered around ring devices for running on flat tires. Most of the conventional devices described below provide variations on flat-run ring devices comprising at least two arcuate portions for fitting over the drop well of a conventional tire rim. A few of the references discuss ring devices having an elastomeric layer for decreasing friction between the inner surface of the tire and the device; however, none of the references describes a removable safety cover for reducing frictional contact between the ring devices and their overlying tire carcasses.

For example, U.S. Pat. No. 5,660,653, issued to Gardetto, discloses a support device for a pneumatic tire wheel for bracing the tire in a deflated or run-flat condition, comprising circular segment support members. Each member has a transverse cylindrical web and radially inward projecting flange portions. The support member segments are interconnected by linkages which provide for radially extending and retracting segments so that the support device may be mounted on a fixed or one-piece wheel having a rim portion with a diameter less than the opposed tire bead support flanges. Threaded bolts are mounted on the wheel rim and extend radially outward into engagement with a link member of each of the linkages which radially extend or retract the support segments. The segment webs are crowned to aid in centering the tire on the support device during operation, and the tire gripping surfaces may be formed on the segment webs to minimize slippage of the tire relative to the support device. A significant drawback of this invention, though, is that the gripping means provided on the web portions comprise a plurality of annular projections formed by die-punching the web portion from its inner wall surface, resulting in a configuration which may have a shearing effect on the inner tire during rotation at high speeds.

U.S. Pat. No. 5,626,696, issued to Boni et al., discusses a device for running on a flat tire, the device being formed by a split ring or by two half-rings that are connected together end to end and clamped onto the rim of a wheel. The half-rings are made of a polyamide that is reinforced with long glass fibers and have a T-shaped section with an outer peripheral surface that forms a tread when running on a flat tire. The tread of each half-ring is constituted by a layer of an elastomer on the radially outer peripheral surface of the half-ring. Potential drawbacks include that the inside surface of the tire is coated with a layer of lubricant, and, unlike the present invention, the elastomeric layer is overmolded onto the peripheral surface.

Similarly, U.S. Pat. No. 5,593,520, issued to Boni et al., discloses a ring device for running on a flat tire, comprising a one-piece split ring received inside the tire and designed to fit over at least a portion of the shape of the rim. The rim is formed with a reinforced thermoplastic resin core having an annular projecting portion, and is fitted with means for fastening together the end portions of the ring and for tightening them onto the rim. In this invention, the annular projecting portion is made from an elastomer such as polyisoprene.

U.S. Pat. No. 5,194,104, issued to Wada et al., discloses a rotating core assembly for a pneumatic tire, for fitting annularly to the outer peripheral surface of the well portion of a rim. When engaged, an outer surface of the core assembly comes into contact with an inner peripheral surface of the pneumatic tire, and an inner peripheral surface of the core assembly slides over the outer peripheral surface of the well portion of the rim. The core assembly includes a sliding portion formed of a resin material and a main body to which the sliding member is secured and which is formed of a material having a high rigidity and a low specific gravity. Accordingly, since the surface of the core assembly contacting the rim is constituted by the sliding member, the core assembly is rotated smoothly when the internal pressure of the pneumatic tire declines, and the overall weight of the core assembly is reduced.

U.S. Pat. No. 5,772,805, issued to Bobst, discloses a wheel safety rim comprising three, equally spaced, contoured pads installed around the center of the outer periphery of a conventional existing wheel rim. The pads are supported by brackets welded to the rim, and the contours of the pads form a circle when positioned correctly. The pads are flexibly moveable relative to the brackets to allow for instantaneous spin balancing during wheel rim rotation as occasioned by vehicle usage. In addition to spin balancing, the wheel safety rim functions to prevent a vehicle from riding on the wheel rim when an associated tire becomes deflated. Also included is a specialized tool for facilitating the installation of the device.

U.S. Pat. No. 4,901,779, discloses a safety tire for vehicles comprising a rim, an air-filled elastic tire concentrically fastened to the rim, and an annular support body mounted on the rim and in rotatable relation therewith to prevent premature destruction of the tire during operation.

U.S. Pat. No. 5,012,849, issued to Ko, shows an internal tire support wheel for vehicles comprising a plurality of tire support plates along both corners of the tire rim, a plurality of legs extending from the support plates, foot elements posed at ends of the legs, and fastening members for serially connecting the plates, so that upon deflation of the tire, the internal support stabilizes the vehicle and prevents the vehicle from tilting.

U.S. Pat. No. 5,141,039, issued to Tansei et al., discusses a pneumatic tire for mounting on the outer surface of the well portion of a rim. The core assembly is 40% to 70% of the height of the tire, to allow for safely running over a given distance when the internal pressure in the tire has been reduced.

U.S. Pat. No. 5,186,771, issued to Carpentier et al., discloses a ring device for running with a flat tire and having articulated sensors for a vehicle equipped with a tubeless tire mounted on a one-piece rim with a drop center.

None of the above inventions and patents, taken either singly or in combination, is seen to describe the instant invention as claimed.

SUMMARY OF THE INVENTION

The device to prevent the full collapse of a pneumatic tire on vehicles and large aircraft comprises a plurality of arcuate portions for cooperatively fitting over the rim of a tire. The device prevents full collapse of a tire carcass by providing a specialized support surface for the carcass of a tire experiencing loss of air. The device may be used on all tire rims such as commonly known in the art and in conventional usage, including the tire rims of trucks, buses, or any other similar motor vehicle, as well as aircraft tires inflated with nitrogen.

Large aircraft have tires inflated with nitrogen. The purpose of this is to prevent corrosion to the wheel assembly, as there exist water particles in compressed air. The tire rims of aircraft wheels mounted near brake assemblies, (i.e., the main landing gear) have temperature fuse plugs that are filled with solder. Their purpose is to melt and deflate the tire if the temperature of the nearby brake becomes too high. The present device will prevent the collapse of the tire once the fuse plug melts and deflates the tire(usually at very low speeds). The inventive device will also act as a safeguard from the tire throwing its carcass as occurred in an accident of an Air France Concord(Super Sonic Transport) during a takeoff from the Paris, France Airport.

The present invention principally comprises three arcuate band portions releasably coupled together for mounting on the drop well of a tire rim to form a substantially continuous surface. The most striking feature of the invention is the protective safety coverings removably disposed on this continuous surface. The protective coverings are provided with frictional means for engaging the inner wall of the tire to prevent circumferential or lateral displacement of the tire carcass during rotation of the wheel. These frictional means may take the form of raised hard rubber protrusions or beads, providing a significant improvement over the prior art.

Accordingly, it is a principal object of the invention to provide a new and improved device for preventing the full collapse of a pneumatic vehicle tire upon partial deflation.

It is another object of the invention to provide a device for preventing the full collapse of a tire which allows a vehicle having a punctured tire to continue running without shearing the tread of the tire.

It is another object of the invention to provide a device for preventing the full collapse of a tire which is safe for usage.

Still another object of the invention is to provide a device for preventing the full collapse of a tire which is easy to mount and dismount.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1B is a fragmented environmental, sectional view of the device to prevent full collapse of a pneumatic tire on a large aircraft.

FIG. 4A is a side view similar to FIG. 3A showing an arcuate portion of the device to prevent collapse of a pneumatic tire on vehicles and large aircraft having an insert for guiding the core members when applied to a flat drop well rim such as is used on large aircraft.

FIG. 4B is a side perspective view of a half portion of the insert of FIG. 4A.

FIG. 4C is a front view of the insert half portion of FIG. 4B demonstrating its placement in relation to the device to prevent full collapse of a pneumatic tire on vehicles or large aircraft.

Similar reference characters denote corresponding features consistently throughout the attached drawings.

DETAILED DESCRIPTION OF THE PREFERRED EMBODIMENTS

The present invention provides a device to prevent the full collapse of a pneumatic tire on vehicles and large aircraft. The preferred embodiment of the present invention is depicted in FIGS. 1–4C, and is generally referenced by the number 5.

Figure 1A:
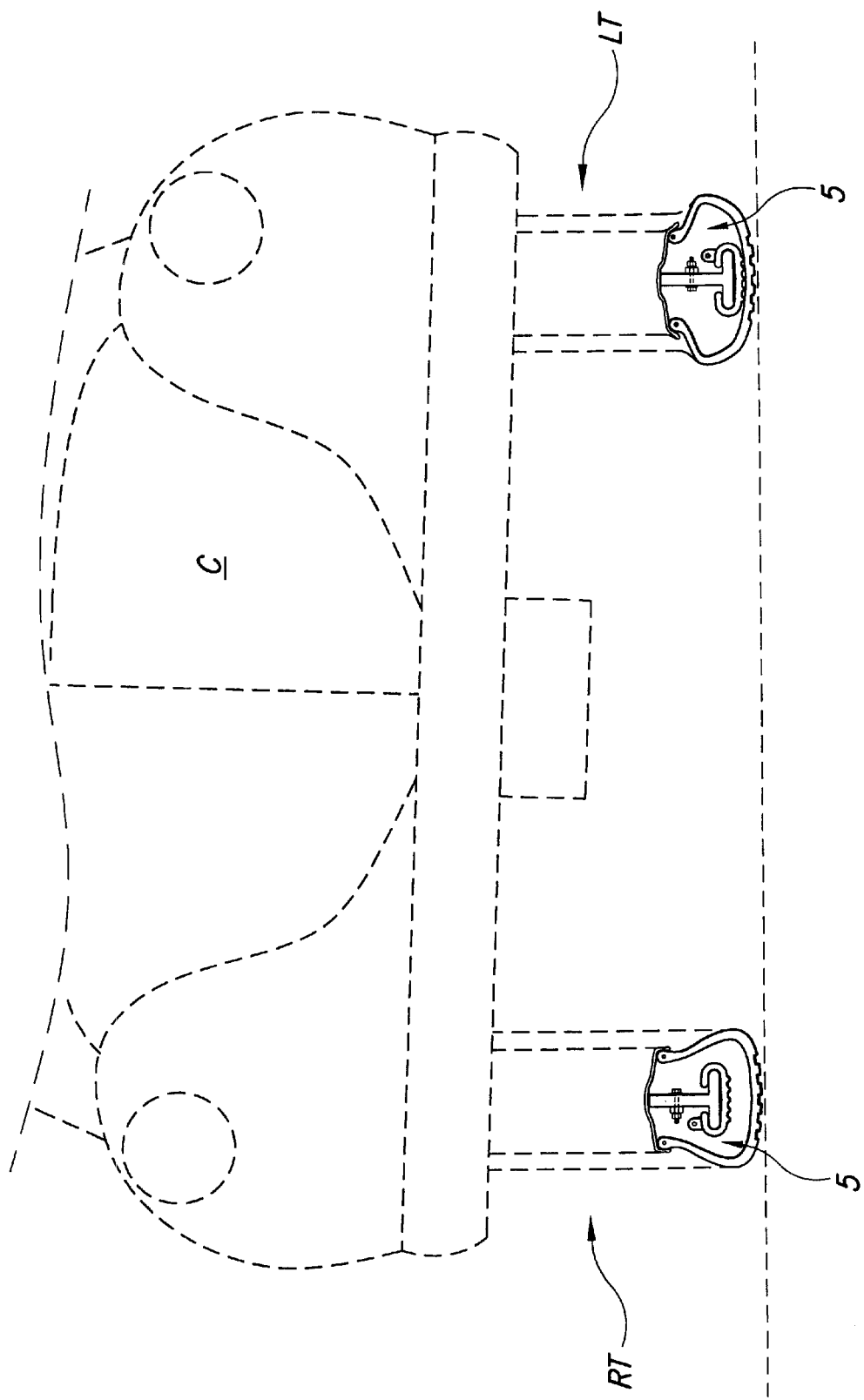
FIG. 1A is a fragmented environmental, sectional view of the device to prevent full collapse of a pneumatic tire on vehicles or large aircraft, according to the invention.

Referring to FIG. 1A, there is shown an environmental view of a conventional tubeless tire and wheel assembly on which the inventive device is installed. As illustrated, the full collapse of a pneumatic tire on vehicles and large aircraft is shown being successfully prevented in car C, thus allowing the driver to return safely home, despite having experienced a serious loss of pressure in the front left tire LT. The right tire RT is shown inflated with the device 5 attached thereon. FIG. 1A allows the observer to see the functional position of the device 5 before and after partial deflation in cutaway views, which views are enlarged in FIGS. 2A and 2B, respectively, for comparison.

As further explained hereinbelow, the device 5 supports the carcass of a tire, generally T, allowing the driver of the car C to continue driving for a limited but safe distance without damaging his tire rim. The tire T and wheel are of conventional design such as commonly known in the art.

Devices for running on flat tires are known in the art; however, improvements in the structure and functioning of such devices can make a significant difference in the incidence of injuries, mortality, and property damage associated with loss of tire pressure.

The inventive device is mounted inside tire T and is rotatably supported on drop well W of the rim R. While device 5 is shown being used on the tire rim of a car, the present invention embraces all tire rims such as commonly known in the art and in conventional use, including the tire rims of trucks, buses, or any other motor vehicle, as well as aircraft tires inflated with nitrogen.

The sudden loss of pressure in a tire T, such as may occur in a blowout, can lead to disastrous results for both car and driver. Last year, the Department of Transportation(DOT) reported that more than 50,000 traffic accidents occurred which were directly due to tire failure, resulting in considerable loss of life and property damage. The present invention makes an important contribution to the art by providing a tire carcass supporting assembly, the shape and size of which allows the carcass of a partially deflated tire to be positionally supported so as to optimize driveability and safety.

Figure 1C:
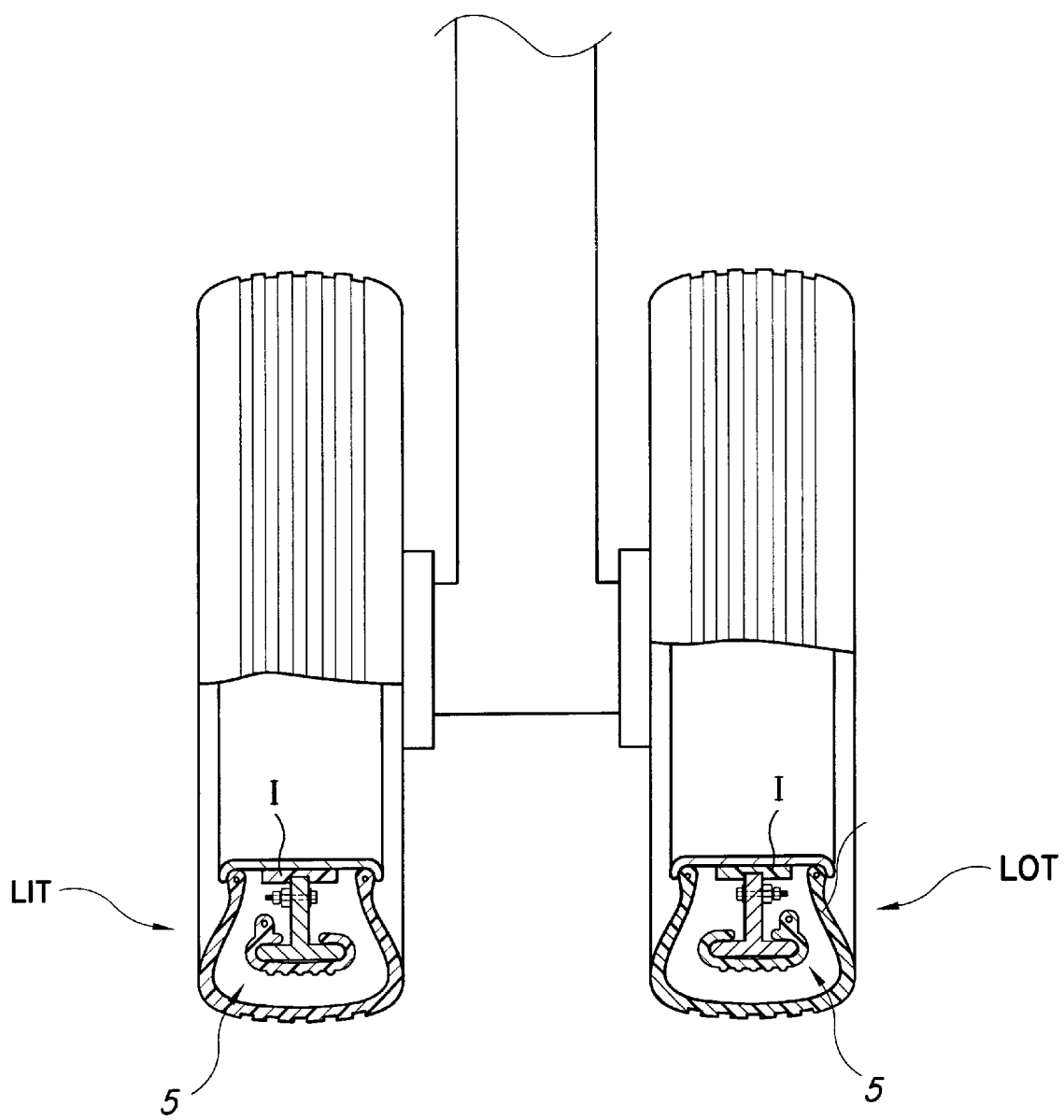
FIG. 1C is an enlarged view of the device to prevent full collapse of a pneumatic tire on a large aircraft as in FIG. 1B and showing the insert for retaining the device of the present invention in place.

As seen in FIG. 1B, the device of the present invention may be installed on the landing wheels of large aircraft in a manner similar to the vehicle of FIG. 1A. Landing gear LG of large aircraft A has the inventive device 5 in left inner tire LIT, and left outer tire LOT. An enlarged view of the device as installed on the landing gear LG wheels as in FIG. 1B is shown in FIG. 1C. It is noted that wheel rims R of large aircraft generally have flat drop wells, necessitating the employment of insert I around the drop well and having a groove to act as a guide in which the inventive device rides. Insert I may also serve as a bearing and a heat shield relative to the rim.

Figure 2B:
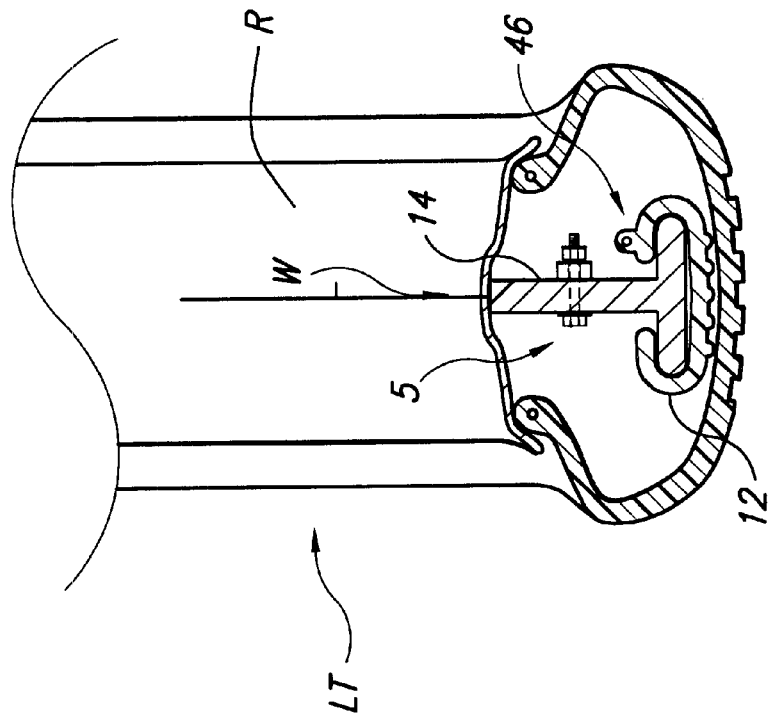
FIG. 2B is a front sectional view of the device to prevent full collapse of a pneumatic tire on vehicles and large aircraft according to the invention, illustrating an enlarged view of the disposition of the device after deflation.
Figure 2A:
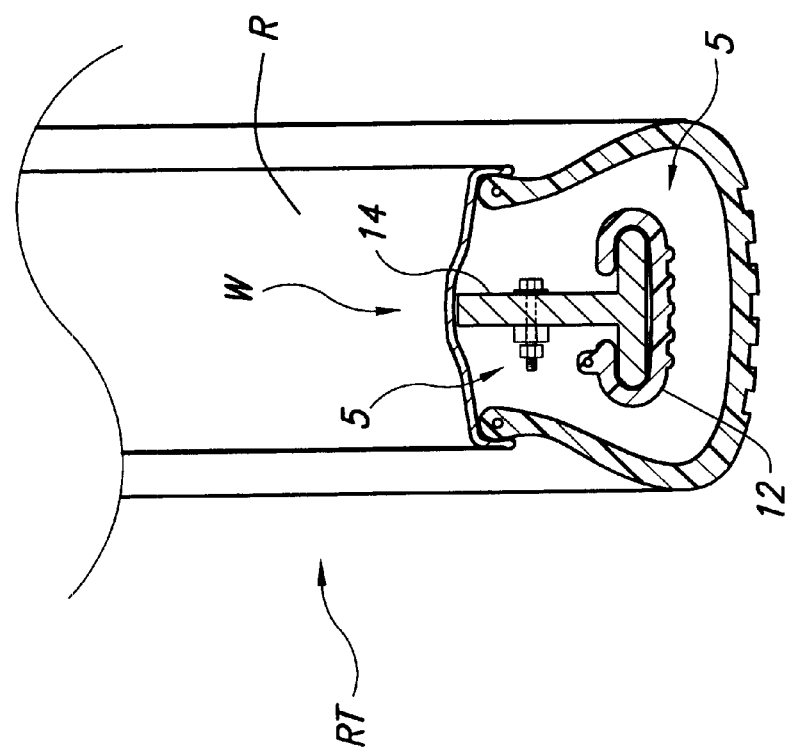
FIG. 2A is a front sectional view of the device to prevent full collapse of a pneumatic tire on vehicles and large aircraft, according to the invention, illustrating an enlarged view of placement of the device on a tire rim prior to deflation.
Figure 3A:
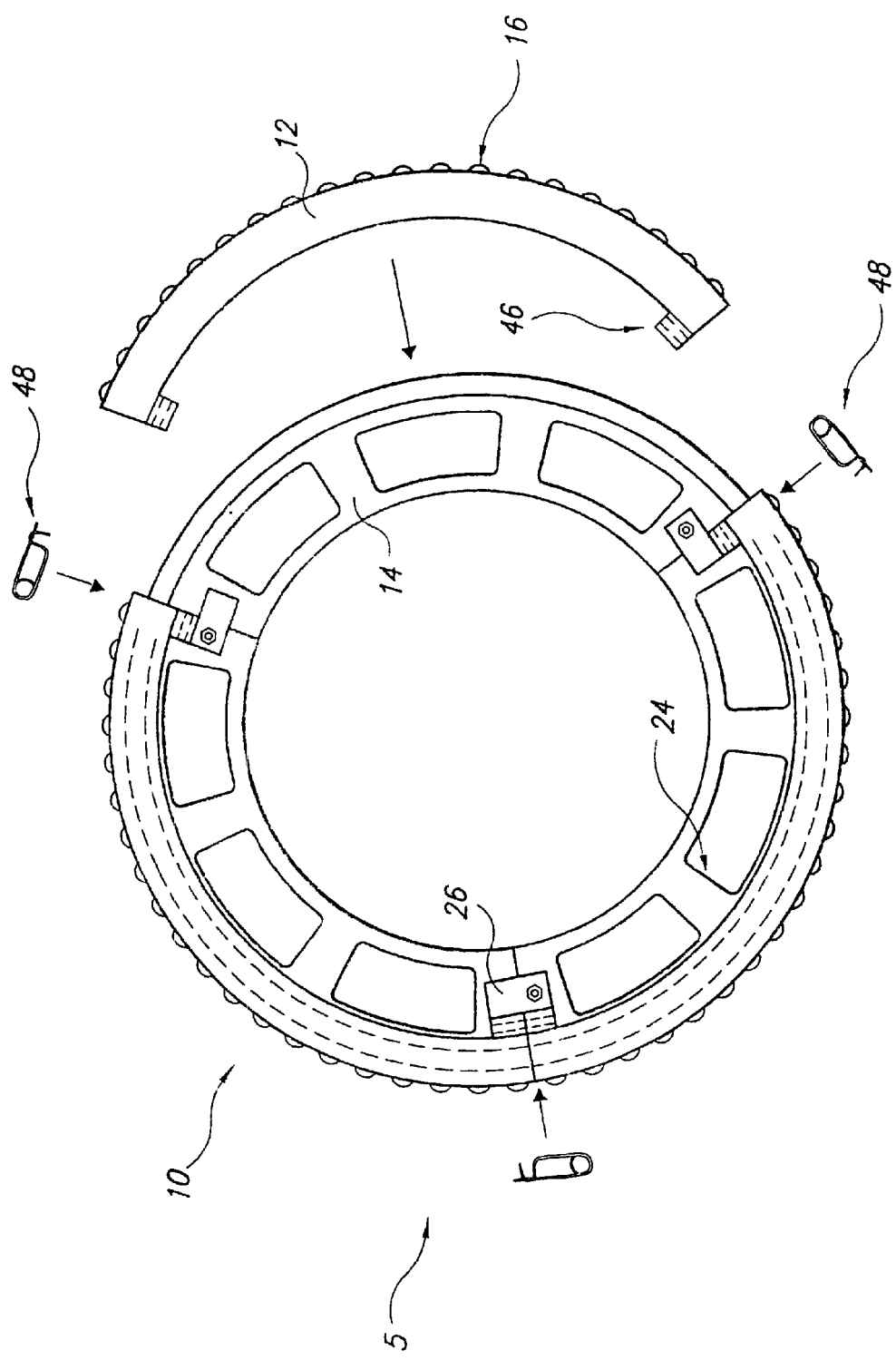
FIG. 3A is a side view of the device to prevent full collapse of a pneumatic tire on vehicles and large aircraft, according to the invention, illustrating various aspects of the arcuate portions.

As can be clearly seen in FIG. 3A, the device 5 to prevent full collapse of a pneumatic tire on vehicles and large aircraft essentially comprises three arcuate band portions 10, releasably coupled together for mounting on the drop well W of a tire rim R (as shown in FIGS. 2A and 2B) to form a substantially arc-shaped device for supporting or bracing the carcass T of a partially deflated tire from underneath. The most striking feature of the device 5 is the protective covering 12, removably disposed on the outer radial segment of each core member 14, substantially as shown.

The modern roadway presents many hidden and unexpected dangers for the motoring public. For example, it is estimated that approximately 90% of personal injuries occur when victims are on the road. Following tire blowout, the beads of the tire are drawn into the well of the wheel and the flanges of the rim begin to act as cutting edges, slicing the tire apart, and exposing the metal wheel to the surface of the road. The core member covers 12 of the present invention should substantially lessen the incidence of such slicing, insuring that the core members 14, themselves, do not become cutting edges as they rotate at high speed. The sudden loss of pressure in a tire can result in loss of control of the vehicle, particularly on icy or snowy roads. Thus, it is easy to see the need for an invention that improves driveability during the initial seconds after loss of tire pressure, a period which can be determinative of life and death.

The protective core member coverings 12 are provided with frictional means for engaging the inner wall of the tire T to prevent circumferential or lateral displacement of the tire carcass T during rotation of the wheel. These frictional means preferably take the form of hard rubber, elongated, hemispherical protrusions or beads 16, as shown in FIGS. 1–3B. The frictional means are designed to make a subtle, physical impression on the inside of the carcass T, sufficient to prevent sliding but not so prominent as to penetrate, penetrably engage, or cause damage. It should be understood that this specification embraces all similar frictional means such as commonly known in the art or in conventional usage, including a pattern of raised lines or ridges of rubber or other material to increase friction (see FIG. 3C and 3D). Additionally, the frictional means or protrusions may be arranged in any pattern, including equally spaced-apart patterns, geometric patterns, irregularly spaced patterns or any combination thereof.

Figure 3B:
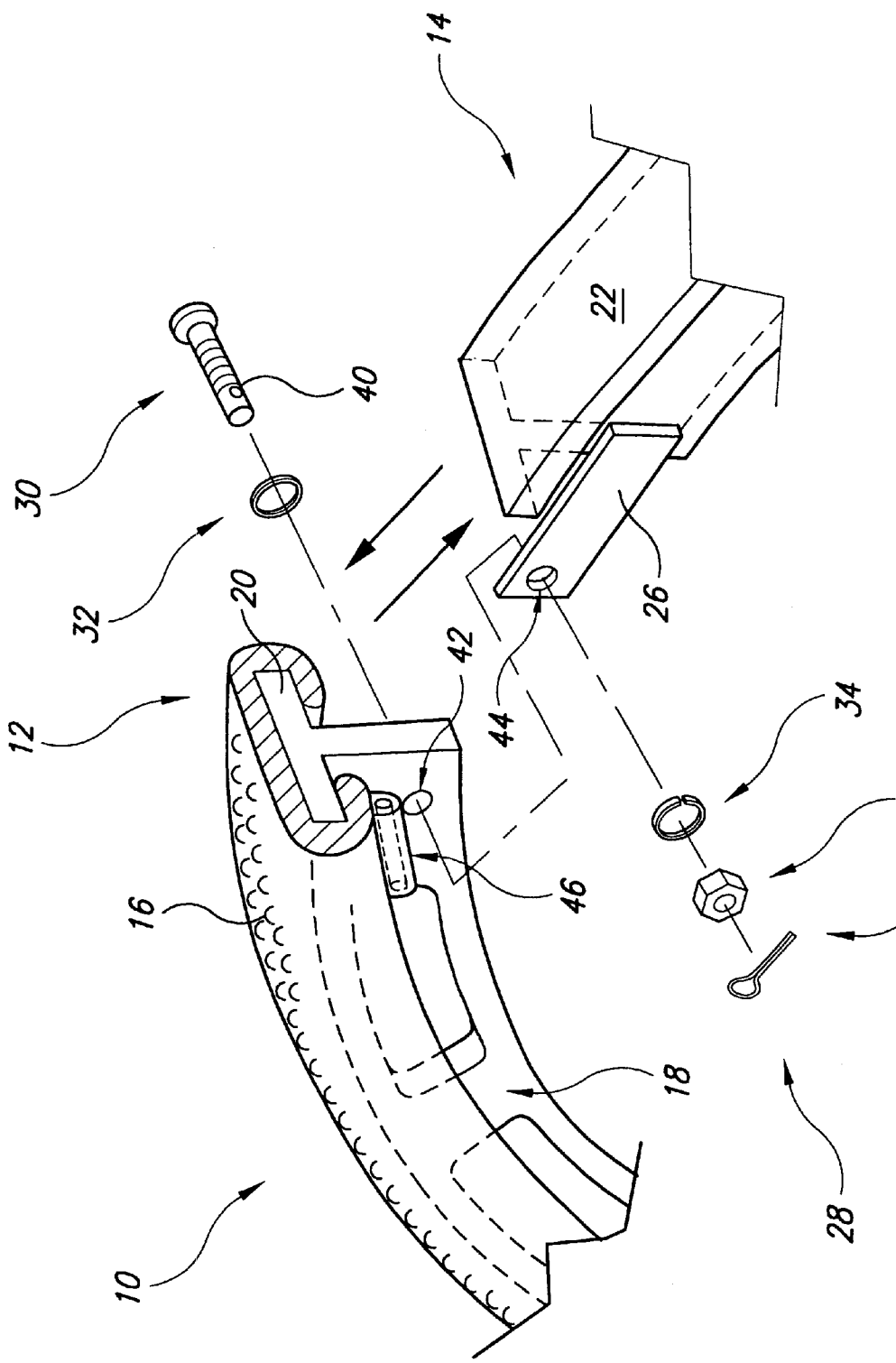
FIG. 3B is a side angle view of the device to prevent full collapse of a pneumatic tire on vehicles and large aircraft, according to the invention, illustrating the manner in which the arcuate portions are coupled together.
Figure 3C:
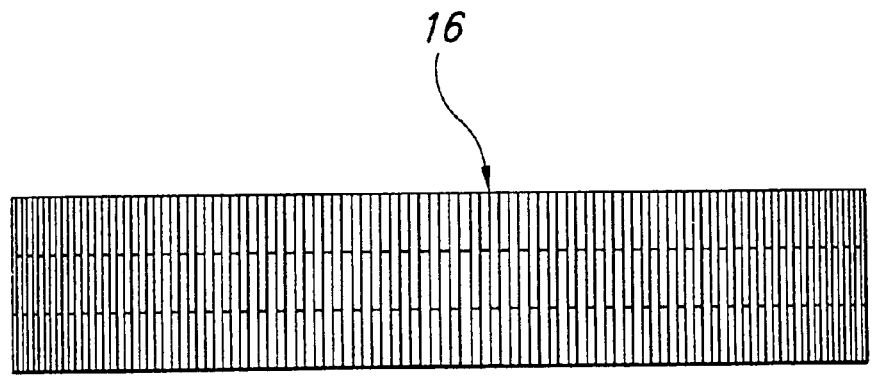
FIG. 3C is a top view of an alternative tread to that of FIG. 3A having radially disposed raised lines or ridges.
Figure 3D:
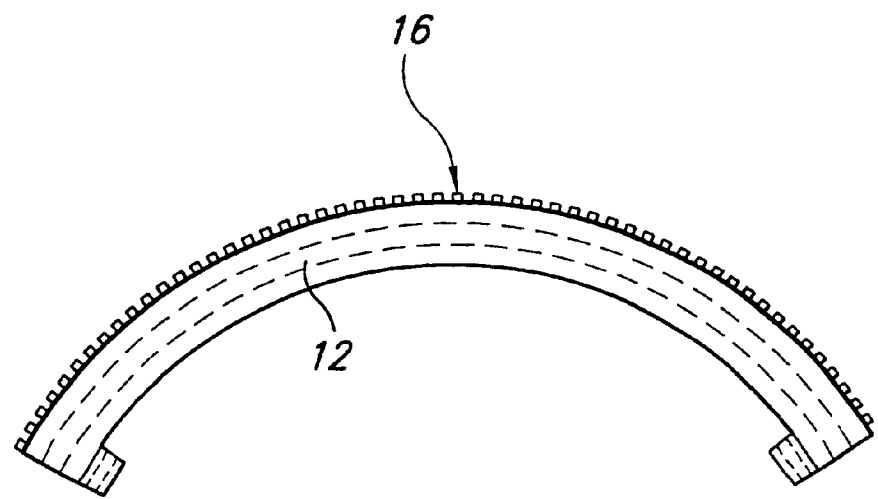
FIG. 3D is a side view of an alternative core member cover of FIG. 3A having the raised lines or ridges of FIG. 3C.

Referring now to FIGS. 3A and 3B, the core members 14 are generally T-shaped in cross-section, providing a sturdy but light structure, to facilitate preservation of the integrity of the tire carcass T upon partial deflation. And so, as clearly seen, the band portions 10 each comprise a core member 14 and a core member cover 12, both having fastening means for connecting to their adjacent core members 14 and core member covers 12, respectively. Each core member cover 12 has a T-shaped slot defined therein and is made to slidingly engage or fit over a core member 14 so as to allow slippage of core cover 12 around core member 14. A silicone solution or other commercially available product such as WD-40® may be used to help slide the covers 12 onto the core members 14 and allow slippage therebetween as described above. Core member covers 12 have treads 16 which may feature protrusions or beads as shown or other tread as desired. When the entire device 5 is assembled and in use on the road, moments of extreme stress on the carcass T of the tire, such as during blowouts, may be dampened by any play inherent in the various constituent components of the invention.

Each T-shaped core member 14 comprises an upright bracket or flange portion 18 and a band or cross member 20, which dimensionally extends to define the curved support surface 22 over which the core member cover 12 is frictionally fitted. It should be noted that the present invention embraces any desired shape for the core member cover 12, whether it partially or completely encapsulates the upper and lower sides of the curved support surface 22 upon which it is disposed.

Turning now to FIG. 3A, each core member 14 is provided with three, substantially rectangular-shaped apertures, the edges 24 of which are generally configured as illustrated. The dimensional extent of these edges 24 is designed to maximize the strength and cooling efficiency of the arcuate portions 10, while minimizing the material necessary to manufacture the core members 14.

Ideally, when the device 5 is mounted on the drop well of a conventional rim, the radial extent of the device 5 is dimensioned so as to be coincident in height with the point approximately midway between the furthest point defined by the carcass T of the tire and the drop well W of the rim R. However, if a tire is experiencing a leak or minor loss of air pressure, the core member covers 12 should prevent any incidental material abrasive effects subsequent to frictional contact between the tire carcass T and arcuate portions 10, such as may occur during transit over rough terrain.

Referring again to FIGS. 3A and 3B, showing the articulation between and assembly of the three arcuate portions 10, it may be seen that the angular extent of each portion 10 is about 120 degrees. Furthermore, the portions 10 are each provided with fastening means comprising an apertured attachment plate 26, fixedly attached to one end of each core member 14, and a corresponding nut and bolt assembly, generally 28. This nut and bolt assembly 28, itself comprises a bolt 30 having an aperture 40 defined transversely through its shaft, preferably made from stainless steel with a high tensile strength, adapted to be disposed through mating aperture 42 in the upright member 18, cooperatively fitting with first washer 32, lock washer 34, nut 36, and lock pin 38, as indicated in 3B.

To prevent any accidental rotation of the nut 36, once the device 5 has been installed on the rim, which could loosen the device 5 and cause an imbalance leading to a decoupling of the device 5 from the wheel, pin 38 is provided for locking the nut 36 against rotation. In the preferred embodiment of the invention, an aperture or channel 40 disposed through the bolt 30 for receiving the pin 38 therethrough accomplishes this result; however, the present invention embraces any and all equivalent fastening means such as commonly known in the art and in conventional usage. In alternative embodiments of the invention, aperture 44 in attachment plate 26 may be slotted or elongated to allow for adjustment between mating portions 10.

As shown in FIGS. 2A to 3B, integrally formed into the structure of the core member cover 12 is an apertured fitting, generally 46, for receiving a spring clip 48 therethrough. A corresponding mirror-image fitting 46, also apertured, is integrally disposed on the next core member cover 12 (so as to be closely adjacent the aforementioned fitting 46 when the core members 14 are coupled together) for cooperatively receiving a portion of the same spring clip 48, substantially as shown. The fitting 46 can be disposed at any appropriate location on the covers 12. Thus, the adjacent core member covers 12 may be securely fastened together. As in the case of the fastening means described for the core members 14, this specification embraces all equivalent fastening means known in the art. It should be noted though, that all fastening means are preferably oriented so as to be on the lateral surfaces of the tires upon which they are mounted to allow for immediate access, easy inspection, and dismounting. Furthermore, it should be understood that this specification embraces any fastening means between the core members 14 and the core member covers 12.

When bolted together, the three arcuate portions 10 form a 360-degree device that is easily assembled and attached on the inner section of a tire rim R after mounting one side of a pneumatic tire to the rim. After mounting the other side of the tire and inflating it with air or nitrogen, the device 5 will be inside the tire and rim. The air or gas pressure in the tire will raise the device 5 high enough above the road or airport surface where it will go undetected during normal operating conditions. The location of the fastening means, 46 and 26, is such that it should minimize the stressful effects due to centrifugal force while maximizing accessibility for the individual placing the device 5 on the rim of the tire.

The invention can be retrofitted on an existing wheel rim or can be attached when new tires are assembled on new rims, coming from the assembly line. When a sufficient amount of air or gas escapes from the tire, the tire moves into a deflated condition in which the inner surface of the tire first comes into abutment with the topmost portion of the core member cover 12. If sufficient upwards force is applied by the ground surface of the road or airport due to the weight of the vehicle or aircraft, the bottommost extent of the core member cover 12 will come into abutment with the tire's inner surface, thereby forming a rigid support of the vehicle or aircraft relative to the wheel rim.

FIGS. 3A and 3B illustrate the cooperation between arcuate portions 10, while FIGS. 2A and 2B illustrate appropriate placement of the invention on a wheel rim. In alternative embodiments of the invention, the section of the arcuate portion which comes into contact with the rim of a wheel may have a frictional pad or layer disposed thereon to facilitate a desired fit and provide an improved frictional surface between the surface of the wheel rim and the portions 10. The frictional layers may be made of a material similar to that used in conventional brake pads, such as semi-metallic or non-asbestos organic composite pads or a ceramic-metal composite.

In the preferred embodiment of the invention, the core members 14 are formed of aircraft aluminum, titanium, magnesium, or hardened steel; however, this specification embraces any other suitable material, including polymeric, synthetic, or light metal. As previously noted, the core member covers 12 are preferably made of hard rubber, but may also comprise a polymeric or any other suitable material. In an alternative embodiment of the invention a resilient means may be interposed between the band portions 10 and the rim, to avoid any inertial problems consequent to rotation of the invention at high speeds.

Referring to FIGS. 1B and 1C, there is shown another embodiment of the invention where the inventive device is employed on the wheels of the landing gear LG of a large aircraft A. Such tires are generally filled with nitrogen, rather than air. and have flat drop wells. The flat drop wells necessitate the introduction of inserts I between the rim R and the device 5 to act as a guide to retain it in place, such as moving laterally relative to the rim.

Tire rims R that are mounted on vehicles and large aircraft with disc type brakes generally have a flatter drop well than rims mounted with drum type brakes. For these type rims (flat drop well), additional inserts are provided to offer support for core members 14 to prevent lateral displacement. Said inserts I consist of, in the present embodiment, two 180 degree guide/bearing/heat shields with a groove to accept core members 14 and are held in place by any desired expedient. and set between the rim's drop well W and core members 14.

Said inserts I offer additional slippage between itself and core members 14 when the tire is in a deflated condition, thus, allowing more integrity to the tire carcass and further preventing its deterioration. Tire rims for drum type brakes having odd shaped drop wells may also be fitted with these type inserts molded to fit the specific shape needed.

These inserts I may be formed from aircraft aluminum, titanium, magnesium, or hardened or stainless steel; however, the present invention embraces any other suitable material, including polymeric, synthetic, light metal or standard or reinforced fiberglass device to prevent full collapse of a pneumatic tire on vehicles.

Figure 2C:
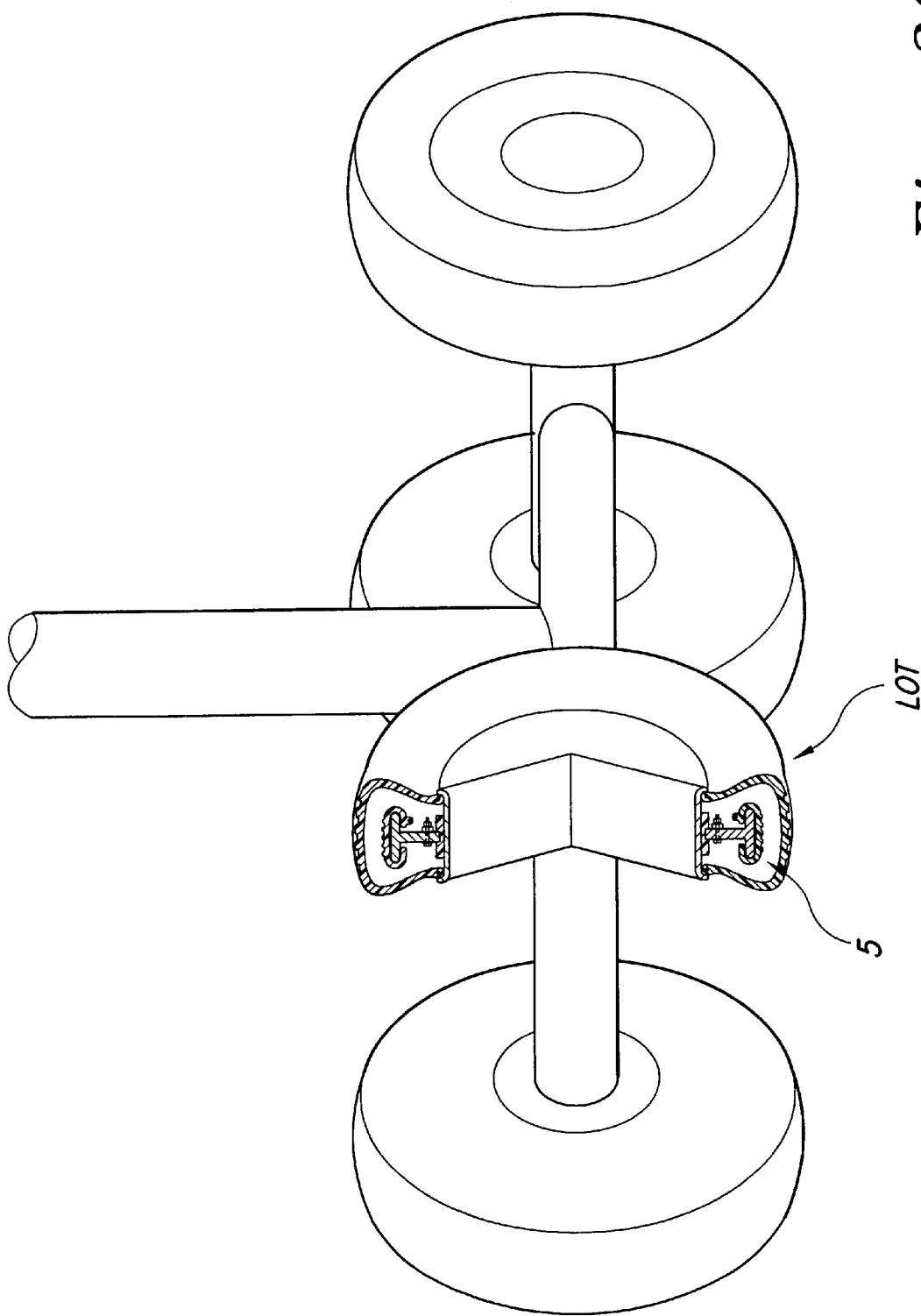
FIG. 2C is a perspective sectional view of the device to prevent full collapse of a pneumatic tire on large aircraft according to the invention.
Figure 2D:
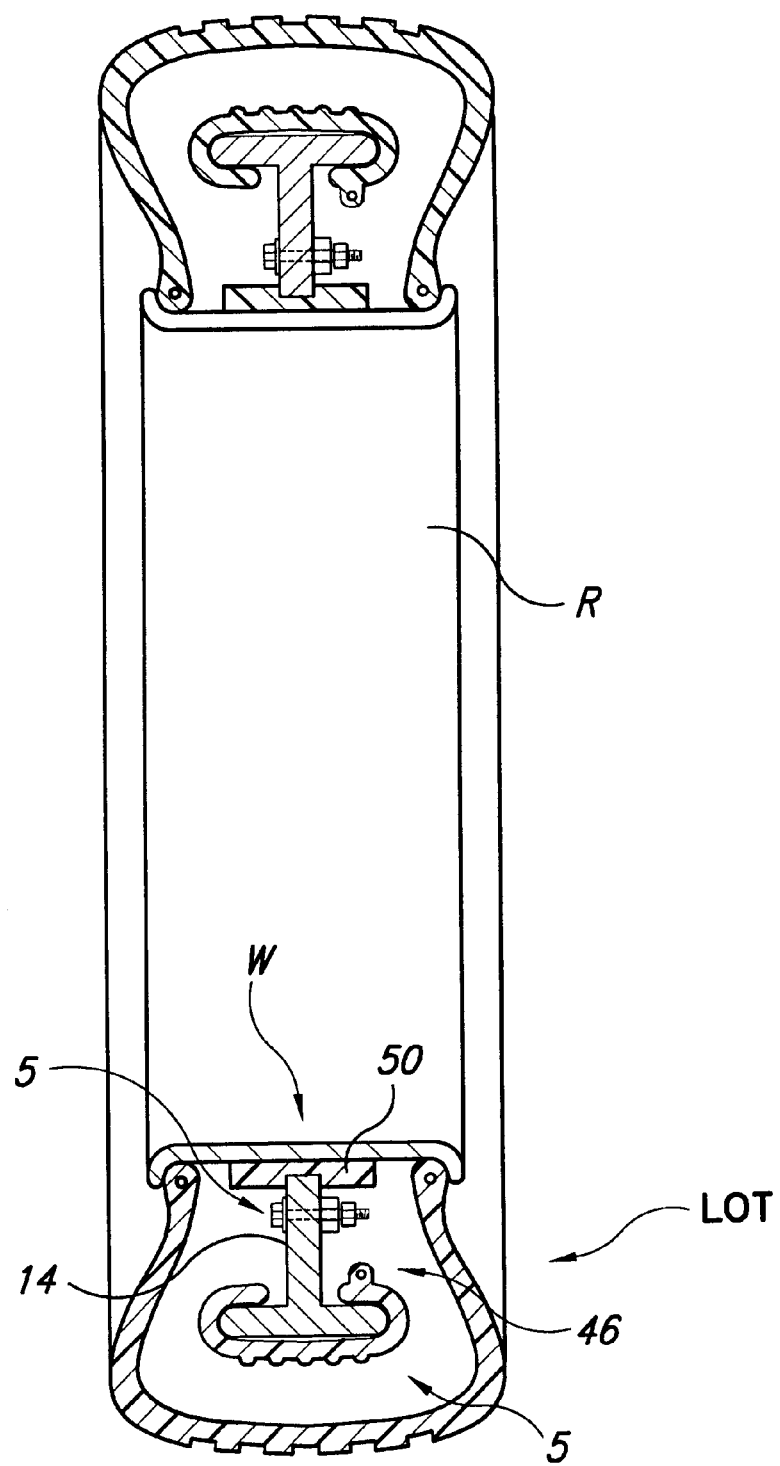
FIG. 2D is a front sectional view of the device to prevent full collapse of a pneumatic tire on vehicles on large aircraft, illustrating an enlarged view of placement of the device on a tire rim prior to deflation.

Referring to FIGS. 2C and 2D there are shown aircraft or vehicle rims R having a flat drop well W and an insert 50 between the rim R and the inventive device 5.

Referring to FIGS. 4A, 4B, and 4C, there are shown details of the flat drop well rim R embodiment described above, wherein there is illustrated in detail the employment of an insert 50 as it relates to an arcuate core member 14 (see FIG. 3A). The insert 50 is preferably a two-part unit, each extending 180 degrees, which mates together by inter-fitting of tabs 52 and tab receivers 54 to surround the flat drop well rim R as shown. Groove 60 is centrally located lengthwise on the outer surface so as to provide a guide for core members 14 after assembly to maintain the core member assembly from lateral movement in relation to the wheel rim R. FIGS. 4A and 4C illustrate the relationship between core members 14 and groove 60 of insert 50. Insert 50 may be constructed of a variety of materials, as discussed above, and may permit additional slippage of the core as related to the tire rim upon tire deflation.

It is to be understood that the present invention is not limited to the sole embodiments described above, but encompasses any and all embodiments within the scope of the following claims.

I claim:

1. A device for preventing complete collapse of a tire on vehicles and large aircraft comprising:
   (a) a plurality of substantially rigid arcuate band portions releasably secured to each other to form a circular loop for mounting in a drop well of a vehicle wheel rim, each of said plurality of arcuate band portions including:
      (i) an arc-shaped core member having a T-shape in cross section, including a cross member portion spaced from said drop well by an upright portion;
      (ii) a core member cover disposed on the cross member of the core member;
   (b) means for connecting each of said plurality of arcuate band portions to adjacent arcuate band portions; and
   (c) means for connecting each of said plurality of core member covers to adjacent core member covers.

2. The device for preventing complete collapse of a tire on vehicles and large aircraft of claim 1, wherein said core member cover defines a T-shaped slot therein, said cover being slidable over said cross member of said core member.

3. The device for preventing complete collapse of a tire on vehicles and large aircraft of claim 1, wherein said core member cover encapsulates said band to which it is attached.

4. The device for preventing complete collapse of a tire on vehicles and large aircraft of claim 1, wherein said cover is made from a synthetic polymeric material.

5. The device for preventing complete collapse of a tire on vehicles and large aircraft of claim 1, wherein said cover is made from a hard rubber material.

6. The device for preventing complete collapse of a tire on vehicles and large aircraft of claim 1, wherein said cover features an interior surface and an exterior surface, said exterior surface having a plurality of spaced-apart protrusions for frictional engagement with an inside surface of a tire when the tire is deflated, said inner surface slidingly engaging said cross member of said core member.

7. The device for preventing complete collapse of a tire on vehicles and large aircraft of claim 1, wherein said means for connecting each of said plurality of core member covers to adjacent core member covers comprise an apertured fitting at each end of said core member adapted and positioned to receive a spring clip connecting said adjacent core member fittings.

8. The device for preventing complete collapse of a tire on vehicles and large aircraft of claim 7, wherein said core member covers are connected together to form a loop for frictionally engaging with an inner surface of a tire when said tire is deflated.

9. The device for preventing complete collapse of a tire on vehicles and large aircraft of claim 1 wherein said arc-shaped core members each define at least one perforation within said upright portion so as to reduce member weight.

10. The device for preventing complete collapse of a tire on vehicles and large aircraft of claim 1, wherein said cover features an interior surface and an exterior surface, said exterior surface having a plurality of radially oriented lines or ridges for frictional engagement with an inside surface of a tire when the tire is deflated, said inner surface slidingly engaging said cross member of said core member.

11. The device for preventing complete collapse of a tire on vehicles and large aircraft of claim 1, further comprising an insert located between said circular loop and said drop well.

12. The device for preventing complete collapse of a tire on vehicles and large aircraft of claim 11, wherein said insert extends completely around said drop well and defines an outer groove so configured as to receive the upright portion of said core member of said circular loop along its inner circumference.

13. The device for preventing complete collapse of a tire on vehicles and large aircraft of claim 12, wherein said insert is provided in at least two parts having means to interconnect said parts so as to form a 360 degree unit for surrounding said drop well.

14. The device for preventing complete collapse of a tire on vehicles and large aircraft of claim 13, wherein said insert is made of polymeric material.

15. The device for preventing complete collapse of a tire on vehicles and large aircraft of claim 13, wherein said insert is made of reinforced fiberglass.

16. The device for preventing complete collapse of a tire on vehicles and large aircraft of claim 13, wherein said insert and said outer groove are so dimensioned as to allow slippage between said core member and said band.

\* \* \* \* \*